Patented July 12, 1949

2,475,699

UNITED STATES PATENT OFFICE 2,475,699

METHOD OF IMPROVING BITUMEN BY BLENDING WITH POLYETHYLENE

Jan Cornelis Derksen, Eindhoven, Netherlands, assignor to Hartford National Bank and Trust Company, Hartford, Conn., as trustee No Drawing. Application February 6, 1947, Serial No. 726,969. In the Netherlands August 11, 1944

Section 1, Public Law 690, August 8, 1946
Patent expires August 11, 1964

4 Claims. (Cl. 260—28.5)

This invention relates to a method of improving bitumen, i. e. natural asphalt and the distillation residues of rock-oil products by mixing with an organic substance and to the composition, particularly for electrical engineering purposes, made with the use of material obtained by this method.

It is known that bitumen is frequently used in the industry for protecting metal surfaces from corrosion, for impregnating, for example, textile or paper material, for sealing objects for electrical purposes in an airtight or dampproof manner and so forth. In this case there is a difficulty in that the bitumen may be brittle, so that it readily crumbles and exhibits small cracks, particularly when shaped in the form of thin layers. This causes the layers to become porous in the course of time so that their ability of forming airtight or dampproof seals decreases and the electric insulation is lowered.

Thus, the invention has for its object to provide a simple method of improving the properties of bitumen, particularly a method of manufacturing material of less brittleness.

According to the invention, this object is achieved by mixing bitumen with a maximum of 30% by weight of solid or semi-solid polyethylene, it having been found that mixing with 5 to 10% by weight suffices to improve the brittleness; even smaller quantities ensure an appreciable improvement. This is particularly important because mixing with larger quantities becomes too expensive to counterbalance the obtained improvement in brittleness.

Polyethylene and bitumen can be mixed in a simple manner, preferably by adding finely powdered polyethylene to molten bitumen or to a solution of bitumen and dividing it evenly in this, for example by stirring. The polyethylene may be added in the dissolved state, any residual solvents being then evaporated.

Apart from the improvement in brittleness the addition of polyethylene to bitumen has the advantage of shifting the yield point to higher pressures, both at ordinary temperature and at higher temperatures. This permits of using bitumen which hitherto could not be used, its yield point being too low at higher temperatures. This is important in connection with those cases in which slight heating of the material may occur, for example, with the use in electrical apparatus.

Bitumen improved in accordance with the invention can be readily worked up in the molten condition, for example in the form of cast or immersed material. It is also possible to cause the mixture to soften in the presence of heat and to form the soft material into the desired shape, for example, by pressing or rolling. The mixture may also be worked up in the dissolved state.

Bitumina according to the invention may be mixed with inorganic substances, such for example as quartz, limestone or the like, so as to permit of its properties being influenced even further. In addition, it is possible to mix bitumina with other organic substances, such as fibrous substances, synthetic resins or the like.

What I claim is:

1. A method of improving asphalt particularly improving the plasticity of asphalt, which comprises mixing from about 5 to 30% by weight of finely divided solid polyethylene with asphalt, and dispersing the polyethylene throughout the asphalt.

2. The method of improving asphalt, particularly improving the plasticity of asphalt, comprising adding from about 5 to 10% of finely-divided solid polyethylene to molten asphalt, and dispersing the polyethylene throughout the molten asphalt.

3. An asphaltic composition of reduced brittleness comprising an asphalt and from about 5 to 30% by weight of polyethylene dispersed throughout the asphalt.

4. An asphaltic composition of improved plasticity comprising an asphalt mixed with from about 5 to 10% by weight of polyethylene.

JAN CORNELIS DERKSEN.

REFERENCES CITED

The following references are of record in the file of this patent:

UNITED STATES PATENTS

| Number | Name | Date |
|---|---|---|
| 2,298,846 | Skooglund | Oct. 13, 1942 |

OTHER REFERENCES

"Asphalts and Allied Substances," Abraham, 4th ed., D. Van Nostrand Company, New York, page 62.